Oct. 14, 1969     J. T. BEESTON, JR     3,472,452
ELECTRONIC FURNACE CONTROL

Filed June 15, 1966     3 Sheets-Sheet 1

INVENTOR.
JOHN T. BEESTON, JR.
BY
ATTORNEY.

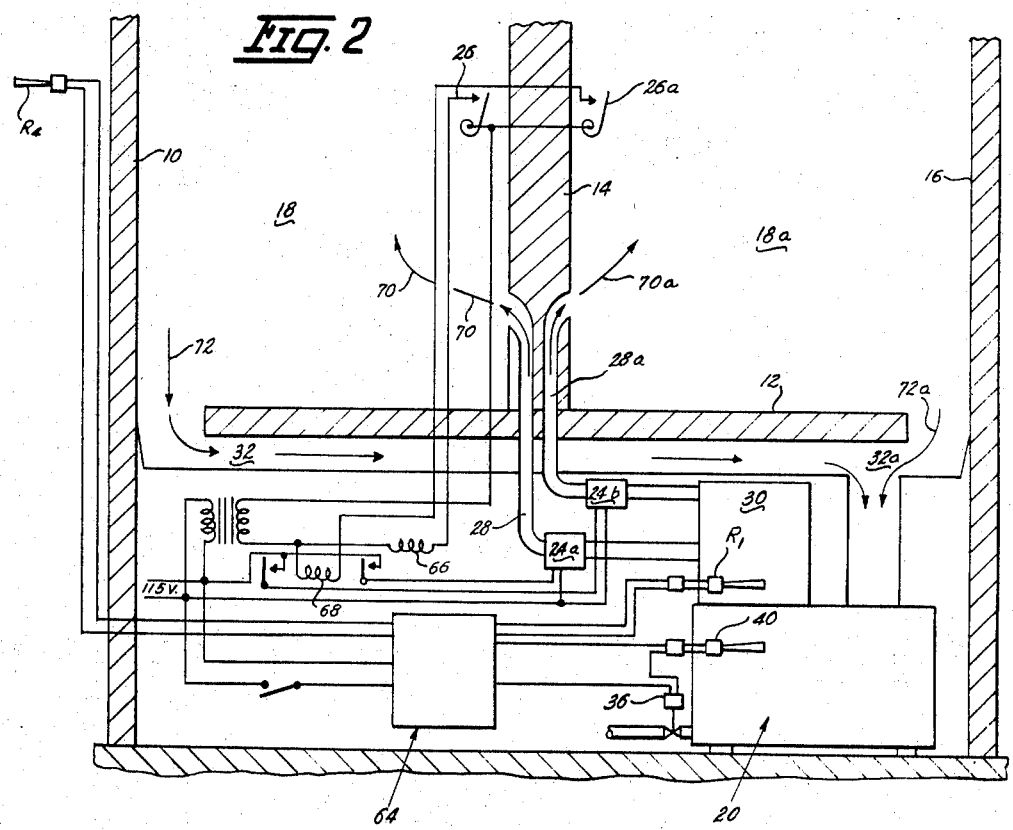

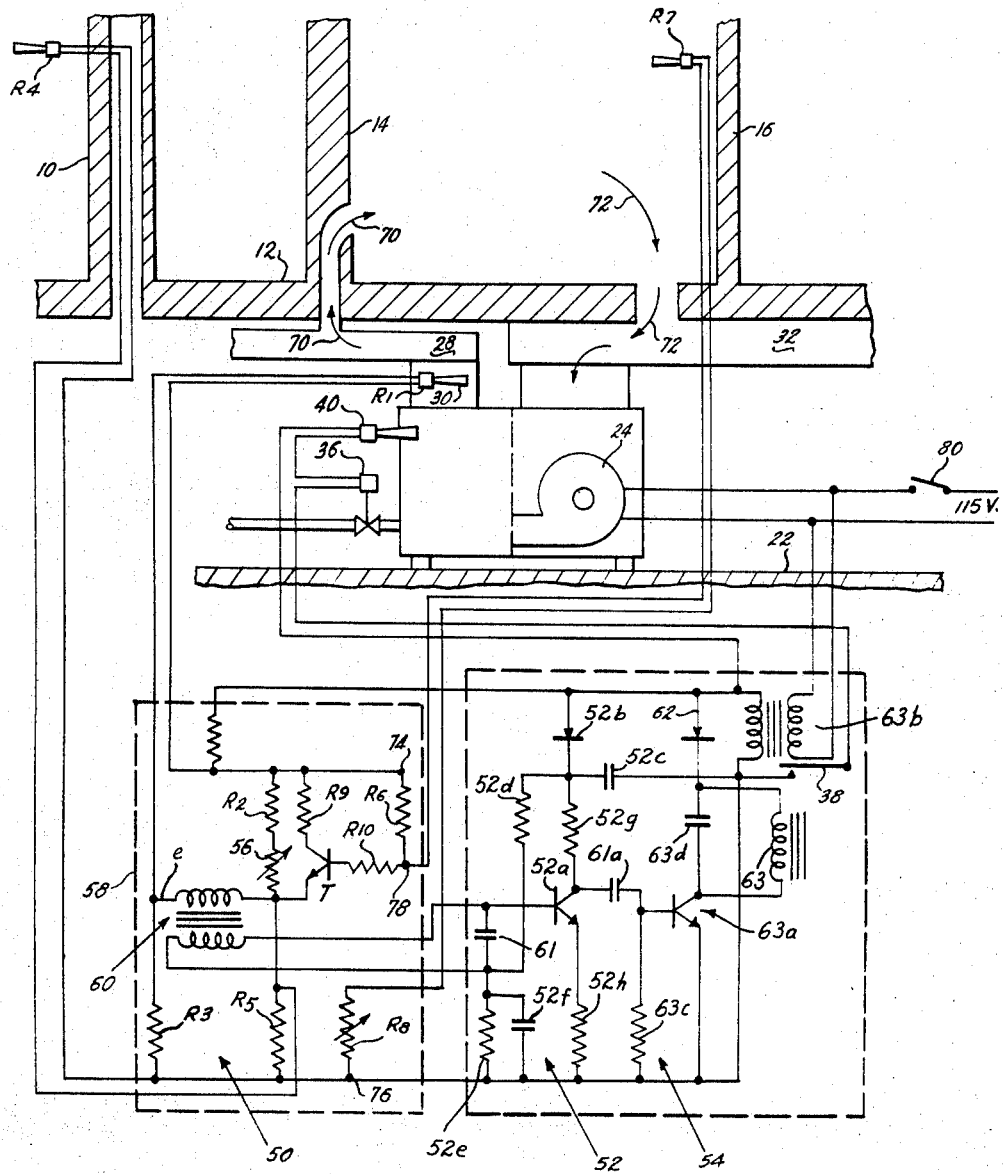

United States Patent Office 3,472,452
Patented Oct. 14, 1969

3,472,452
ELECTRONIC FURNACE CONTROL
John T. Beeston, Jr., 712 32nd St.,
Des Moines, Iowa 50312
Filed June 15, 1966, Ser. No. 557,691
Int. Cl. G05d 23/08, 23/19
U.S. Cl. 236—9       10 Claims

ABSTRACT OF THE DISCLOSURE

An electronic analog heating controller having a normally balanced bridge. The circuitry includes temperature responsive elements both outdoors and in the furnace plenum whereby variation in temperature resulting in the unbalancing of the bridge create an output signal for regulating the fuel supply to the furnace. Also includes a phase detector circuit whereby the burner for the fuel supply is actuated only upon the unbalancing of the bridge in one phase.

---

Figure 1:
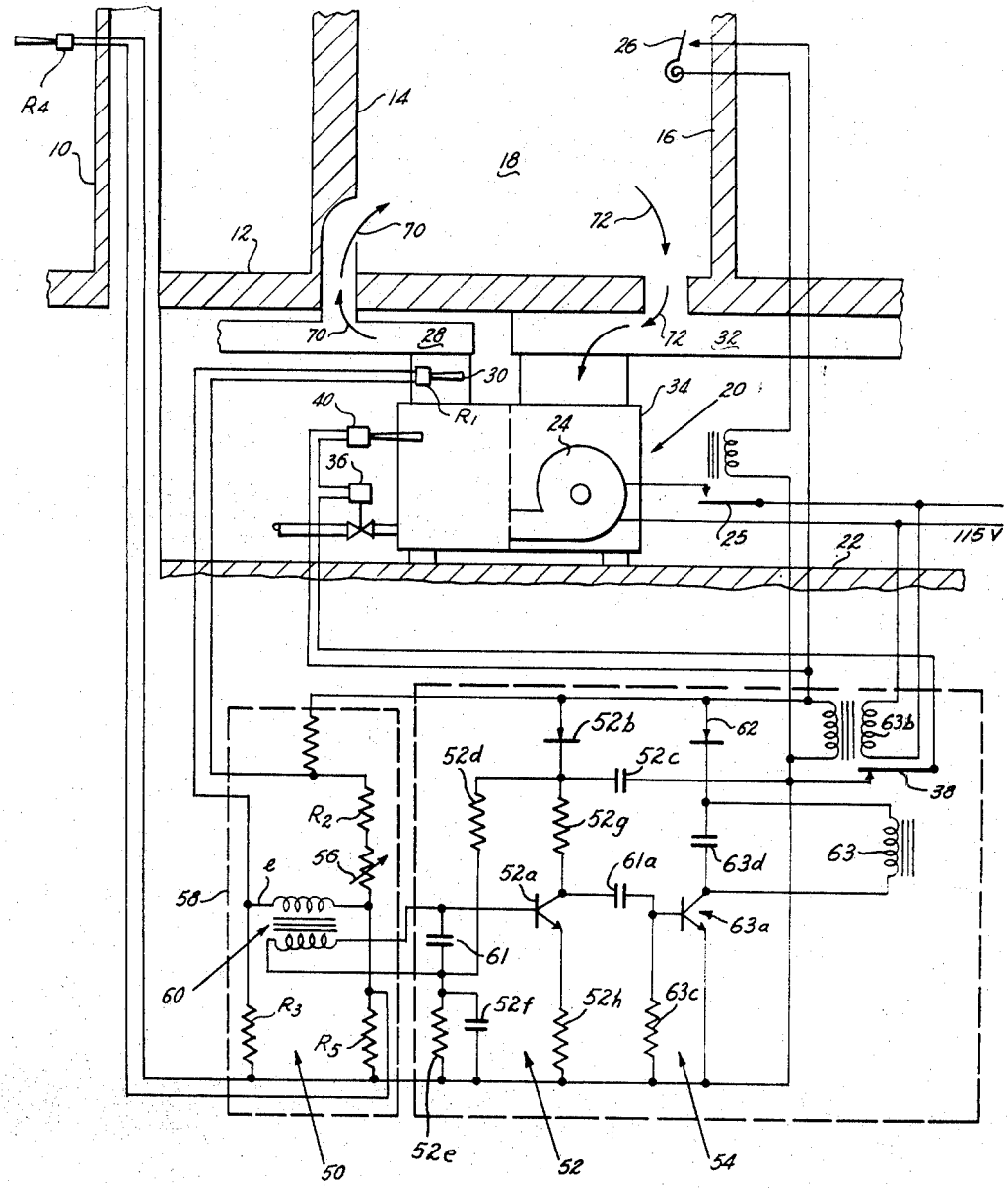

This invention relates to an improved electronic temperature control device together with an improved zone temperature control means for a forced air heating system.

The most efficient results and maximum comfort to be obtained from a heating system will result when there is provided a constant temperature inside an enclosure while the outside temperature varies up and down at random with temperature fluctuations during the different seasons. It is therefore important that a heating controller keep a heating system informed of and trimmed to outside conditions before the inside enclosure feels the need of more or less heat. Most of the heating control systems used today fail to do this since they are designed to wait for a change in the inside temperature before calling upon the heating system to correct for the situation and thus a control system of this kind will lag behind the conditions it is trying to correct. In addition, when such a heating system does turn on, it generally operates at full heat output and often overproduces the required amount of heat needed at the time. Because of this factor, anticipating devices are commonly added to the control system to correct for this over-running and while such devices aid in reducing the amount of the over-run, they do not eliminate it.

From experience it is known that on warm days less heat is required from a furnace installation than on colder days and consequently, the temperature of the plenum air should change with the outside temperature so that such plenum air is cooler on warm days and hotter on cold days. With such a situation, the temperature on the outside and within the plenum are inverse to each other and their relationship is linear, that is, changing degree for degree.

The fuel burner element in most of the heat control systems commonly used today is regulated by a room thermostat and another control, responsive to heat temperatures in the plenum, is used to actuate the furnace blower for circulating the heated air with the result that when the room thermostat calls for the heat, the plenum will frequently have cooled down so that there is a time lag before the plenum is heated sufficiently to actuate the blower. This lag results in what has been called the cold 70° since a coolness is quite apparent in the room which is waiting for heat.

With the above observations in mind, one of the important objects contemplated by this invention is the provision of an electronic analog heating controller that will maintain the temperature in the furnace plenum at a predetermined ratio solely in relation to the outside temperature so that the air in the plenum is constantly and consistently of the desired warmness necessary to adequately heat the enclosure according to the particular time and season of the year. This arrangement provides a constant heat source from which there will be a continuous heat flow into the distribution ducts so that such heat flow closely resembles the continuous heat from the old style coal fired furnace. However, since natural convection circulation will not maintain adequate temperatures in a forced air system, a blower and blower control is utilized whereby another important object relates thereto in providing that the operation of the blower is regulated solely by a thermostatic control located in the area which will be heated.

More particularly this invention contemplates the provision of an electronic bridge circuit which includes one temperature responsive element located in the furnace plenum and another temperature responsive element out of doors and wherein the balance point of the bridge in such circuit can be arbitrarily fixed to provide a predetermined temperature ratio between the temperature of the plenum and the outdoor temperature.

Another object of this invention is to provide in a circuit of the above class for an output control signal to actuate the burner for the fuel supply to the furnace wherein such control signal is responsive solely to the unbalancing of the bridge which in turn is responsive solely to variations in predetermined temperature ratios in the plenum and outdoors. Coupled with this is the provision of a phase detector circuit whereby said control signal actuates the burner for the furnace fuel supply only upon the unbalancing of the bridge in one phase.

A further object contemplated herein is the provision of an improved zone control system whereby a plurality of zones to be heated can be individually supplied with adequately warm heat from a common plenum and wherein the temperature of the plenum is solely controlled in relation to the outside temperature.

Still another object of this invention is to provide a variable control means within said bridge circuit whereby the balance point for the temperature ratio between the plenum and the outdoors can be varied as may be desired or required under particular conditions.

A further object herein is to provide a modified control circuit permitting continuous blower operation with control means responsive to room temperature that will vary the value at the bridge determined by the plenum and outdoor probes as may be necessary.

To attain these objects and such further objects as may appear herein, or be hereinafter pointed out, reference is made to the accompanying drawings forming a part hereof, in which:

FIG. 1 is a schematic illustration of a heating system in a building and including a wiring diagram of the circuitry of this invention for controlling the temperatures in the system and in one of the areas to be heated, FIG. 2 is similar to FIG. 1 but is modified to show the use of this invention for purposes of zone heating control, and FIG. 3 is a wiring diagram of the modified circuit for continuous blower operation.

Referring to the drawings, the outside wall of a building is designated by the numeral 10 with an inside floor indicated at 12 that supports the interior walls 14 and 16 defining a room 18. A gas furnace 20 of any well known construction is shown mounted on a basement floor 22 for purposes of illustration, it being understood that an oil burning furnace or even a hot water system can be equipped with the control circuit that will be described herein. Such furnace 20 includes a blower 24 electrically connected for actuation by relay 25 which is connected to a thermostat 26 located within room 18 on any suitable wall therein such as 16 and in this respect is different from usual arrangements where the blower is controlled by a thermostatic switch that is mounted in the furnace and is responsive to the temperature therein. Heat runs such as 28 carry heat from the plenum 30 of furnace 20 and a cold air return 32 from room 18 communicates with blower section 34 in a well known manner. A gas valve 36 is operatively connected to a burner assembly (not shown) in the furnace in a well known manner and is actuated by the switch member 38 which, as will later be described in more detail, is actuated in accordance with outdoor temperature and thus differs from conventional installations where the gas burner valve is actuated by the room thermostat. A standard type limit switch 40 is preferably and usually associated with the interior of the furnace and can be preset for definite temperature limits so as to shut off the gas valve 36 if such limits are overrun for any unexpected reason. Thus far described, with the exception of the switching connections for the blower 24 and the gas valve 36, the parts referred to represent a more or less standard type of general furnace arrangement and no invention is claimed in such parts per se.

With reference now to the circuitry for this electronic control, it comprises generally a bridge circuit 50, an amplifier circuit 52 and a phase detector circuit 54. Mathematical relationships of the standard balanced bridge circuit contain inverse functions readily adapted to this control system and the comparative nature of the balanced bridge offers the possibilities of adjusting the relationship of temperature scales to one another.

In the bridge circuit 50, resistances are represented by $R_1$ which is in the form of a temperature sensitive probe mounted in the plenum 30; $R_2$, $R_3$, and $R_4$ which is in the form of a temperature sensitive probe mounted outdoors on the building wall 10 and $R_5$ which is placed in parallel with $R_4$. The value of $R_5$ is chosen so that the total resistance of the parallel will track the resistance change of $R_1$ over the designed temperature range of the controller. Voltage across the bridge is designated by $e$. In a circuit as so far described and assuming $R_1$ and $R_4$ to be ordinary resistance opposite the respective $R_2$ and $R_3$ resistance, it will be understood that at balance where $e$ becomes zero, $R_1R_4-R_2R_3=0$ since the two products $R_1R_4$ and $R_2R_3$ have the same numerical value when such expression is satisfied. Since $R_1$ and $R_4$ are inversely related, they can be adjusted for balance to a pre-determined value which I shall designate as K. Accordingly, by applying the above formula to my temperature control system where $R_1$ is the bridge resistance located outdoors, the products $R_1R_4$ can be fixed at the predetermined value K. In the present system I have arbitrarily fixed the limits of K as $-20°$ F. for $R_4$ and $180°$ F. for $R_1$ and when the outdoor temperature is $-20°$ F., the plenum temperature will be $180°$ F. As the outdoor temperature rises, the plenum temperature decreases degree for degree since the relationship of $R_1$ and $R_4$ is linear. This can be further expressed by the equation $$R_1R_4=K=R_2R_3$$

or $$R_1R_4=K$$

and $$R_1=K/R_4$$

The value of K is also given by the product $R_2R_3$ so that any change to K from the product $R_2R_3$ will also change the product $R_1R_4$ to effect a new balance in the bridge 50.

With reference to the value K based on a design temperature of $-20°$ F. outdoors and $180°$ F. in the plenum, it is recognized that there will be installations where this relationship will be incorrect for a particular job. To make this system adaptable to these situations where variations will be necessary, a variable control 56 is provided for easy adjustment, and this may be in the form of a suitable knob or dial (not shown) located exteriorly of the housing 58 for circuit 50. Control 56 is thus a third input to the computing bridge 50, and actually offsets the outdoor-plenum temperatures to some other values than $-20°$ and $180°$ given above. For example, if at $-20°$ outdoors only $165°$ plenum is necessary, an adjustment of control 56 will accomplish this change. By way of further illustration, assume that this control system is to be installed in a latitude where at zero degrees, a plenum temperature of $140°$ F. is deemed adequate for the heating system, this will call for a new value of K because to balance the bridge at zero and $140°$ F., either $R_2$ or $R_3$ will have to be changed to match the new value of K and for illustration here, $R_2$ can be increased to bring about the desired plenum change given above.

The unbalancing of bridge 50 creates voltage in the transformer 60 which impresses a signal on the amplifier circuit 52 for acting on switch 38 to actuate the gas valve 36. Circuit 52 includes the transistor amplifier 52a to which a DC power supply is formed by rectifier 52b and condenser 52c. Resistances 52d and 52e form a divider to provide a bias voltage for the base of transistor 52a and condenser 52f is a bypass for resistance 52e. Resistance 52g' is a collector load resistance for transistor 52a and resistance 52h is an emitter resistance to provide stability to said transistor. This input to circuit 52 from transformer 60 transfers the signal from a balanced output of the bridge to the unbalanced transistor input. The capacitor 61 shunted across the transformer secondary tunes the transformer reactance to the 60 cycle signal. Tuning restores the signal parameters so it has sinusoidal wave shape, and is symmetrical about its axis.

The output of transistor amplifier 52 is coupled to the phase detector circuit 54 through condenser 61a. Circuit 54 includes the diode rectifier 62, a relay winding 63, and a transistor 63a all in series connected across AC supply voltage from transformer 63b. Base resistance 63c provides a path to ground for the base current of transistor 63a and condenser 63d is a filter capacitor for relay 63. Conduction through this series circuit is accomplished by the "and logic" of diode 62 and transistor 63a. Thus, when AC voltage from transformer 63b is in the positive half of the cycle and AC voltage from amplifier state 54 is in its positive half of its cycle, both "and" elements are in their conductive mode allowing current to flow through relay winding 63 actuating its armature and contacts 38. The condenser connected across relay winding 63 is used to maintain the DC or rectified potential during the negative half cycle of the signals. It can be seen that the series circuit will not conduct when either element, the diode or transistor, is in the negative portion of their respective signals. Therefore, if the bridge balance were to change to the opposite phase by going through its null condition and becoming unbalanced on the other side, the signal at transistor 63a would not allow it to be conductive when diode 62 is conductive, resulting in no current through relay winding 63. Therefore, to make relay 63 operate, the voltage from the AC supply transformer and from the amplifier 52 must be in phase with one another. The series "and" circuit becomes a phase discriminating detector, allowing current to flow through relay winding 63 only when the bridge is unbalanced on the correct side of the null or balance point, and no other. By this arrangement, circuit 54 assures that the gas valve 36 will operate only when the bridge 50 is unbalanced under conditions when $R_1$, the plenum probe, requires heat to balance the requirements of the outdoor probe, $R_4$. Without circuit 54, it will be appreciated that when $R_1$ calls for heat, the bridge is unbalanced and valve 36 will operate until the bridge is in balance to open valve 36. However, any override of heat would unbalance the bridge in the opposite phase which again transmits a signal to circuit 52 and since it is desired not to heat the plenum at this point, circuit 54 effectively excludes the signal from this phase from acting on switch 38.

With reference now to FIG. 2 where the control system described above is used for multiple zone control, like parts are given like numerals and since two rooms are shown here instead of the one room in FIG. 1, the second room and related parts for purposes here is given the same numerals as in FIG. 1 followed by an appropriate letter. In this arrangement where multiple zones such as 18 and 18a are to be heated, a single source or reservoir of heat is provided by plenum 30 where the temperature is maintained as previously described by the circuits 50, 52 and 54 here represented only schematically by the box 64. Blowers 24a and 24b are duct blowers in this arrangement disposed respectively in the heat runs 28 and 28a to the respective rooms 18 and 18a and controlled by the respective room thermostats 26 and 26a. Relays 66 and 68 are provided for blowers 24a and 24b in a well known manner. Thus with a duct blower for each zone to be heated, no blower is required or necessary in furnace 20.

OPERATION

In explaining the operation of this furnace control system, let it be assumed for a new installation, the system is starting from the beginning. Let it also be assumed that the room thermostat 26 is not calling for heat, the outdoor temperature is 40° F., and the plenum temperature is 80° F., since such a plenum temperature would be normal due to the residual heat created by usual pilot lights in the burner assembly. All connections are made as shown in the diagram in FIG. 1 and the circuit is closed to the 115 v. power source.

Under these assigned conditions there will be an unbalanced computer bridge 50 as a result of the 40° outdoor temperature and the 80° plenum temperature. Such unbalanced computing bridge 50 causes a signal voltage to be impressed on the amplifier 52 and phase detector 54 which closes the gas valve relay 38 and opens the gas valve 36 to the furnace burner. With the burner on, the plenum temperature starts to rise and continues to rise to a point where the plenum temperature probe resistance $R_1$ brings the computing bridge 50 to balance. In the balanced state, the computing bridge 50 reduces the signal voltage to zero which opens the gas valve relay 38 and closes the burner gas valve 36. The point of balance is determined by both outdoor and plenum temperatures. For an outdoor temperature of 40°, the computer bridge 56 will balance when the plenum temperature rises to 120° F., and it will remain at 120° as long as the outdoor temperature remains at 40°. However, if the outdoor temperature changes to 30° F., then the computer bridge 50 rebalances with a plenum temperature of 130° F. Two functions are now evident. An unbalanced bridge 50 opens the gas valve 36 and a balanced computer bridge closes the valve. Also, the outdoor and plenum temperatures are inversely related degree for degree.

As the plenum temperature increases, the heated air will begin to move through the hot air duct system 28 due to convection until it reaches the space to be heated. Direction of the hot air movement is shown in the diagram by the arrows 70. Cold air, indicated by the arrows 72, will move in to replace the hot air as it moves out of the furnace. The colder air will begin to cool the plenum 30 to a point where the plenum probe $R_1$ unbalances the computer bridge 50 to turn on the furnace burner as previously described and the plenum temperature is restored to 120°. This on-off process continues to maintain the plenum temperature at its preassigned value. By this arrangement, it will be appreciated that the natural convection process caused by a heated plenum is continually supplying hot air to the space to be heated, and when the plenum temperature drops, the gas burner is started by the computer bridge to restore the plenum to its proper temperature.

Natural convection circulation in a blower equipped furnace is, of course, not enough to maintain desirable temperatures because the duct sizing is not large enough for the low velocity of air. Therefore, it is necessary to use the blower when more heat is needed to maintain the required temperature and in this system, a room thermostat 26 operates the blower 24 only when more heat is required from the furnace.

An important advantage with this method of control is that no compensation devices are needed in the thermostat 26 such as heat anticipation because the correct air temperature is always present in the hot air plenum 30 for a given outdoor temperature. In the normal furnace control, the plenum temperature always rises to the hottest value regardless of outdoor temperature and therefore must be shot down long before the heated space is brought back to temperature in order not to overheat the space. Another advantage is the natural convection of hot air from a hot plenum makes the fall of temperature in the heated space very much slower than with the normal system and thereby give the comfort of not noticing any cooling effect whatever.

Fuel economy is accomplished since the furnace is not allowed to cool down and be reheated to a hot temperature each time heat is needed, but instead, is kept at a temperature that is a result of outdoor temperature. In the fall and spring seasons when the daytime temperatures are high, the blower will not be required because the natural convection is sufficient to warm the space. At night when more heat is needed, only the right amount is provided by this system according to the outdoor temperature. For safety reasons, as explained previously, a limit switch 40 is connected in series with the gas valve circuit to prevent overheating in case of relay or computer failure.

The operation just described is the same in FIG. 2 where heat is provided from the single plenum 30 by the separate duct blowers 24a and 24b in response to the respective zone thermostats 26 and 26a. Thus individual rooms or zones can be heated individually without regard to temperatures in other rooms or zones and without the necessity of providing separate heat sources for each zone.

It will be appreciated that this control circuit as thus far described uses a heating system that has a greater capacity than is needed except at the design temperature of −20° F. when it will theoretically run continuously to supply the calorie demand. At any outside temperature higher than −20° F. the plenum temperature is reduced in accordance with a degree for degree basis as described previously and such degree for degree relationship provides the heating system with an accurate reference means in maintaining proper calorie input into the plenum so that the room thermostat, which controls the blower, can withdraw heat from the plenum as needed to supply more calories is the final trimming device in maintaining the correct room temperature. Thus, the system so far described, uses an on-off blower action which is much more economical than a constant blower operation as should be obvious. However, it is recognized that there are situations where continuous air circulation (CAC) is needed or desired and this requires continuous blower operation. For such situations, the on-off room thermostat 26 must be replaced with a control means that will adjust the plenum temperature to the correct value for continuous air circulation.

In a continuous air circulation system, the amount of heat introduced from a heating unit must be exactly equal to the heat loss at all times to maintain an even heat in the heated space. Where the room thermostat and intermittent blower action served as a leveling device before, a different means must be introduced in the CAC system where the final room temperature differential further modifies the plenum temperature so that only the required heat is generated to maintain the room temperature. Accordingly, I have provided a modified circuit for this electronic controller system so that it can be used effectively on a continuous air circulation installation as follows.

With reference to FIG. 3 where like parts are given like numerals as in FIGS. 1 and 2, elements of the bridge are designated as $R_1$, $R_2$, $R_3$, and $R_4$ as before so that again the expression is $R_1R_4=R_2R_3$ and product $R_1R_4$ has been arranged to shut down the fuel or heat supply when it becomes equal to product $R_2R_3$. When product $R_1R_4$ is less than $R_2R_3$ the heat supply is turned on. The final result is that when either $R_1$ or $R_4$ senses rising temperatures above their assigned values, the heat supply is shut down. In this situation, $R_4$ is policing outdoor temperatures, and $R_1$ sensing plenum temperatures as previously described. Consequently, to further regulate the room temperature a control must be placed in the room to replace the thermostat 26 which directly controls blower 24. Such new room control must sense in the same direction as $R_1$ and $R_4$ and have the same kind of control so that a rising room temperature can shut off the heat supply, or, a falling temperature can turn it on. Furthermore, the new room sensor should be able to vary the plenum temperature slightly, so that if the room becomes too warm, a cooler plenum will result and conversely, a cooling effect in the room will cause a warmer plenum. It is preferably desirable for the new room sensor to detect very small changes and relate these small changes into the controller circuit as big or amplified changes as this would assure excellent trimming of the room temperature.

All of these desirable effects are accomplished by substituting for thermostat 26, a room sensor identified as $R_7$ and introducing room sensor changes in parallel with $R_2$ and 56 through a transistor T. Transistor T serves two purposes in amplifying the room sensor $R_7$ changes and inverting their polarity into the proper phase for the computing circuit as follows.

Transistor T is connected in shunt across $R_2$ and 56 acting to reduce their value when transistor T begins to pass current which is in direct response to the value of $R_7$. Resistors $R_6$, $R_7$, and $R_8$ in series are provided to act as voltage dividers between points 74 and 76. With $R_7$ as the temperature sensor resistance located in the room, $R_8$ is adjustable to bring point 78 to its proper quiescent potential. Point 78 is adjusted by $R_8$ so no current flows through T when the desired room temperature is existant. Thus, when the room temperature cools, $R_7$ increases its value raising the potential of point 78 so T begins to conduct current which acts to reduce the total resistance of $R_2$ and 56 in series. The reduction of $R_2$ and 56 will demand a hotter plenum temperature until the room temperature begins to raise again to its adjusted temperature. Amplification is obtained through T. $R_9$ is provided as a limiting resistance to prevent T from completely shorting $R_2$ and 56. The resistance of T and $R_9$ can never be any less than the value of $R_9$. $R_{10}$ is provided between T and point 78 and is used when the base resistance of transistor T is too low for $R_6$, $R_7$, and $R_8$.

In the expression $R_1R_4=R_2R_3=K$, where $R_2$ includes resistance 56, resistance 56 provides a means of varying the value of K (previously defined) to bring about a new outdoor-plenum relationship. The addition of transistor T and $R_9$ provides another means of varying the value of K through the changes in room temperature. In the operation of the circuit shown in FIG. 3, it will be understood that the blower 24 will be wired for continuous operation and for such purposes, may be controlled by a simple on-off switch 80 in a well known manner.

From the foregoing it is thought a full understanding of construction and operation of this invention will be had and the advantages of the same will be appreciated.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A control system for use with a furnace having a plenum chamber and electrically responsive means for controlling the fuel flow thereto, comprising:
    a first temperature sensitive resistance adapted to be placed in the plenum chamber;
    a second temperature sensitive resistance adapted to be placed to react directly to temperatures outside a building in which the furnace is located;
    a normally balanced Wheatstone bridge means having first and second parallel branches adapted to be coupled across a power source, each branch having respective first and second sections connected in series;
    output means coupled across the junctions between said first and second sections of each branch;
    the first section of one of said branches having said first temperature sensitive resistance therein;
    the section of the other of said branches having said second temperature sensitive resistance therein; and
    the unbalancing of said bridge means resulting from temperature variations affecting said first and second temperature sensitive resistances acting on said output means to actuate said electrically responsive means;
    said control system further including a plurality of conduits each connected to said plenum and each extending to a respective zone to be heated;
    a dampered duct blower in each of said conduits exteriorly of said plenum for moving heated air from said plenum to said respective zones;
    temperature responsive control means in each zone; and
    each temperature responsive control means connected to the duct blower serving its zone whereby each duct blower is actuated according to the heat requirements of a single zone and heat is provided thereto from said plenum where the temperature is controlled solely by said first and second temperature resistances.

2. A control system as defined in claim 1 wherein at least one of said sections has an adjustable resistance therein.

3. A control system as defined in claim 1 wherein:
    said bridge is adapted to be coupled across an AC power source,
    said output means includes means for sensing bridge unbalance and the phase thereof, and
    means for controlling said electrically responsive means in accordance therewith.

4. A control system as defined in claim 2 wherein said means for sensing bridge unbalance and the phase thereof comprises an amplifier and phase detector circuit.

5. A control system as defined in claim 1 wherein:
    said output means comprises transformer means coupled across said junctions,
    signal sensing means coupled to said transformer means, and
    means responsive to said signal sensing means for controlling said electrically responsive means.

6. A control system as defined in claim 1 wherein said output means includes means providing an output for controlling said electrically responsive means only when the temperature sensed by said second temperature sensitive resistance is less than the temperature sensed by said first temperature sensitive resistance.

7. A system for controlling the temperature of an indoors zone to be heated by a furnace, said system comprising in combination:
    furnace means including a plenum chamber containing a heating medium;
    actuatable transport means for transporting said heating medium in said plenum chamber to the indoors zone;

furnace control means for establishing an initial differential between the temperature of said heating medium in said plenum chamber of said furnace and the temperature of an outdoors location, said furnace control means being responsive to changes in the temperature of the outdoors location to automatically alter the temperature of said heating medium in said plenum chamber of said furnace in an inverse, linear relationship, whereby said initial temperature differential is varied; and means responsive to deviations in temperature of the indoors zone to control said actuatable transport means.

8. A system as defined in claim 7 wherein said furnace control means includes a bridge circuit means, an adjustable resistor means electrically coupled in one branch of said bridge circuit means, a first temperature sensing means disposed at the outdoors location and electrically coupled in another branch of said bridge circuit means, a second temperature sensing means disposed in said plenum chamber of said furnace and electrically coupled in still another branch of said bridge circuit means, an electrically responsive fuel control means for said furnace coupled to said bridge circuit means and responsive to an unbalance thereof, said adjustable resistor means setting the balance point of said bridge circuit means whereby said initial temperature differential is established.

9. A system as defined in claim 8 wherein said means responsive to deviations in temperature of the indoors zone comprises a thermostat.

10. A system for controlling the temperature of an indoors zone to be heated by a furnace, said system comprising in combination:

furnace means including a plenum chamber containing a heating medium;

transport means for continuously transporting said heating medium in said plenum chamber to the indoors zone; and furnace control means for establishing an initial differential between the temperature of said heating medium in said plenum chamber of said furnace and the temperature of an outdoors location, said furnace control means being responsive to changes in the temperature of the outdoors location and to deviations in temperature of the indoors zone to automatically alter the temperature of said heating medium in said plenum chamber of said furnace in an inverse, linear relationship whereby said initial temperature differential is varied;

said furnace control means including a bridge circuit means, an adjustable resistor means electrically coupled in one branch of said bridge circuit means, a first temperature sensing means disposed at the outdoors location and electrically coupled in another branch of said bridge circuit means, a second temperature sensing means disposed in said plenum chamber of said furnace and electrically coupled in still another branch of said bridge circuit means, a third temperature sensing means disposed in the indoors zone and electrically coupled with said adjustable resistor means in said one branch of said bridge circuit means, an electrically responsive fuel control means for said furnace coupled to said bridge circuit means and responsive to an unbalance thereof said adjustable resistor means and said third temperature sensing means jointly setting the balance point of said bridge circuit means whereby said initial temperature differential is established.

References Cited
UNITED STATES PATENTS

| | | | |
|---|---|---|---|
| 1,999,053 | 4/1935 | Kingsland | 236—91 |
| 2,265,512 | 12/1941 | Brown et al. | 236—91 |
| 2,777,640 | 1/1957 | Kaufman | 236—78 |
| 2,804,269 | 8/1957 | Galavics | 236—91 |
| 3,050,257 | 8/1962 | Sweger et al. | 236—91 |
| 3,216,662 | 11/1965 | Gerzon | 236—9 |
| 2,403,917 | 7/1946 | Gille | 236—1 |
| 2,144,668 | 1/1939 | Stoessel | 236—78 |
| 2,729,396 | 1/1956 | Impey et al. | 236—78 X |
| 3,171,595 | 3/1965 | Krenke. | |

EDWARD J. MICHAEL, Primary Examiner

U.S. Cl. X.R.

236—11, 91